(12) United States Patent
Usami

(10) Patent No.: US 9,780,691 B1
(45) Date of Patent: Oct. 3, 2017

(54) AC-DC POWER CONVERSION APPARATUS TO OUTPUT BOOSTED DC VOLTAGE

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Yutaka Usami, Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/202,692

(22) Filed: Jul. 6, 2016

(51) Int. Cl.
H02M 1/00 (2006.01)
H02M 7/797 (2006.01)
H02M 7/217 (2006.01)
H02M 1/08 (2006.01)

(52) U.S. Cl.
CPC ............. H02M 7/217 (2013.01); H02M 1/08 (2013.01); *H02M 2001/0009* (2013.01)

(58) Field of Classification Search
CPC . H02M 7/217; H02M 1/08; H02M 2001/0009
See application file for complete search history.

(56) References Cited

U.S. PATENT DOCUMENTS

| 2015/0326128 A1* | 11/2015 | Usami | H02M 1/4258 363/21.12 |
| 2015/0340871 A1* | 11/2015 | Usami | H02M 1/4258 307/72 |
| 2016/0043648 A1* | 2/2016 | Usami | H02M 1/12 363/21.12 |

FOREIGN PATENT DOCUMENTS

JP 01-259758 10/1989
JP 2010-119159 5/2010

* cited by examiner

*Primary Examiner* — Emily P Pham
(74) *Attorney, Agent, or Firm* — Amin, Turocy & Watson LLP

(57) ABSTRACT

A power conversion apparatus comprises a circuit, a detection section and a control section. The control section supplies a pulse signal for enabling the first switch and the second switch to be opened and closed alternately according to a polarity of the alternating voltage power supply so that a sine wave current synchronized with a voltage phase of the alternating voltage power supply flows to the alternating voltage power supply on the basis of the voltages and current obtained from the detection section.

10 Claims, 9 Drawing Sheets

AC-DC POWER CONVERSION APPARATUS TO OUTPUT BOOSTED DC VOLTAGE

FIELD

Embodiments described herein relate generally to converting an alternating current voltage obtained from an alternating current power supply to a direct current voltage for supplying power to a load.

BACKGROUND

In a circuit which converts an alternating voltage of alternating voltage power supply to a direct voltage on the basis of the alternating voltage, an alternating voltage flowing to the alternating voltage power supply becomes a sine-wave shape in phase with voltage of the alternating voltage power supply. In such a circuit, a phase factor is the most efficient, and no harmonic noise occurs. Such a circuit that performs a control so that an input current becomes a sine wave is called as a PFC (Phase Factor Collection). Hereinafter, the function is referred to as the PFC.

The PFC controls a circuit current so that a sine wave current in phase with an alternating voltage phase of the alternating power supply flows. Thus, a module of detecting the circuit current is necessary.

However, a position where the circuit current can be detected is a position potential at which is different from GND potential of the circuit, and thus a module of insulating a signal is necessary. In general, an insulation current transformer is used to realize insulation of the signal.

Further, even if the current can be detected by the current transformer, the signal is weak and a malfunction caused by noise mixing always occurs. Thus, an implementation for acquiring a signal at a position nearest to a control GND is desired, if possible.

Further, in order to perform a control with certainly, if the current transformer tries to detect not only a 50 Hz component of the alternating voltage power supply but also a 50 kHz component of the switching frequency, a special part of which range of frequency characteristics is wide is necessary for a core used in the current transformer. If the part is mounted, the size of the current transformer becomes large and the price thereof is undesirably higher than a general core.

DETAILED DESCRIPTION

Figure 1:
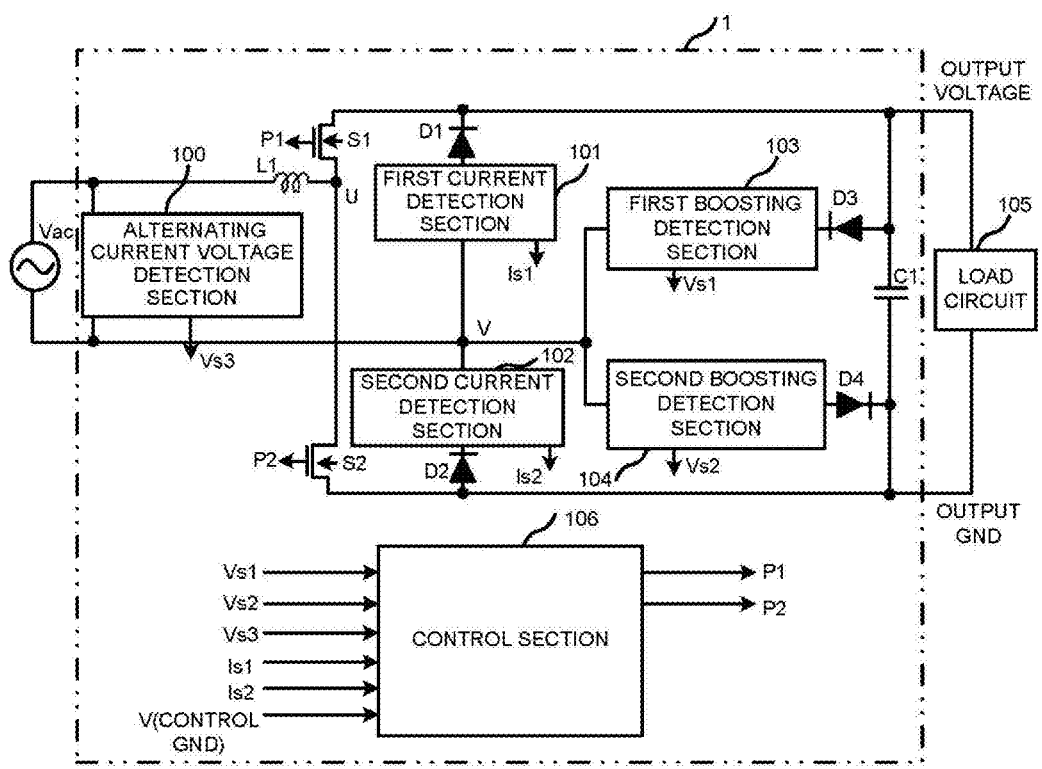
FIG. 1 is a circuit structure diagram of a power conversion apparatus according to a first embodiment.

In accordance with an embodiment, a power conversion apparatus comprises a power conversion circuit, an alternating voltage detection section, a boosted DC output voltage detection, a current detection section and a control section. The power conversion circuit includes a first switch, a second switch connecting with the first switch in series, a first diode and a second diode connecting with the first diode in series. Further, the power conversion circuit includes a closed circuit that respectively connects the first switch and the first diode with the second switch and the second diode and a first inductor connecting with alternating voltage power supply in series. The power conversion circuit includes a first connection point, positioned between the first switch and the second switch, which connects with one end of the series connection of the alternating voltage power supply and the first inductor, a second connection point, positioned between the first diode and the second diode, which connects with the other end of the series connection of the alternating voltage power supply and the first inductor and a capacitor connected with both ends of the series connection of the first diode and the second diode. The power conversion circuit takes potential difference of both ends of the capacitor as an output voltage. The alternating current voltage detection section detects a power supply voltage of the alternating voltage power supply. The boosted DC output voltage detection section detects a both-end voltage of the capacitor. The current detection section detects a current flowing to the first and second diodes. The control section supplies a pulse signal for enabling the first switch and the second switch to be opened and closed alternately in response to a polarity of the alternating current power supply so that a sine wave current synchronized with a voltage phase of the alternating voltage power supply flows to the alternating voltage power supply on the basis of the power supply voltage obtained from the alternating voltage detection section, a boosted DC output voltage obtained from the boosted DC output voltage detection section and the circuit current obtained from the current detection section.

Further, in accordance with another embodiment, a power conversion apparatus comprises a power conversion circuit, an alternating current voltage detection section, a boosting detection section, a voltage detection section and a control section. The power conversion circuit includes a first switch, a second switch connecting with the first switch in series, a third switch and a fourth switch connecting with the third switch in series. The power conversion circuit includes a closed circuit that respectively connects the first switch and the third switch with the second switch and the fourth switch. The power conversion circuit includes a first inductor connecting with alternating current power supply in series, a first connection point, positioned between the first switch and the second switch, which connects with one end of the series connection of the alternating current power supply and the first inductor, a second connection point, positioned between the third switch and the fourth switch, which connects with the other end of the series connection of the alternating voltage power supply and the first inductor, and a capacitor connected with both ends of the series connection of the third switch and the fourth switch. The power conversion circuit takes the potential difference of both ends of the capacitor as an output voltage. The alternating voltage detection section detects a power supply voltage of the alternating voltage power supply. The boosted DC output voltage detection section detects a both-end voltage of the capacitor. The voltage detection section detects both-end voltages of two switches generated at the time of a synchronous rectification operation of the third switch and the fourth switch. The control section supplies a pulse signal for enabling the first switch and the second switch to be opened and closed alternately in response to a polarity of the alternating voltage power supply so that a sine wave current synchronized with a voltage phase of the alternating voltage power supply flows to the alternating voltage power supply on the basis of the power supply voltage obtained from the alternating voltage detection section, the boosted DC output voltage obtained from the detection section and the both-end voltages of the third switch and the fourth switch obtained from the voltage detection section. Further, the control section supplies a pulse signal for enabling the third switch and the fourth switch to alternately carry out synchronous rectification according to the polarity of the alternating current power supply.

Hereinafter, two embodiments relating to power conversion apparatuses are described with reference to the accompanying drawings.

FIG. 1 is a diagram illustrating the circuit structure of a power conversion apparatus according to a first embodiment. The power conversion apparatus 1 inputs alternating voltage power supply Vac to be connected with a load circuit 105 which operates through a direct current voltage.

The power conversion apparatus 1 connects two semiconductor switches S1 and S2 and two diodes D1 and D2 to form a bridge. The semiconductor switches S1 and S2 may be a switch module using, for example, a MOSFET, a GaN transistor, a SiC transistor and other compound transistors. Herein, N-type MOSFET is described as an example. The N-type MOSFET operates as a switch if a current flows from drain towards source. In other words, the N-type MOSFET conducts in a case in which a gate signal is H level and does not conduct in a case in which the gate signal is L level. On the contrary, if a current flows through the N-type MOSFET from the source to the drain, the N-type MOSFET is always in a conduction state by means of a body diode whether the gate signal is H level or L level.

The drain of the switch S1 connects with cathode of the diode D1, and the source of the switch S1 connects with the drain of the switch S2. Further, anode of the diode D1 connects with cathode of the diode D2. The source of the switch S2 connects with anode of the diode D2 to form a bridge circuit.

A capacitor C1 is connected between the cathode of the diode D1 and the anode of the diode D2.

The negative electrode side of the capacitor C1 is regarded as an output GND, the positive electrode side of the capacitor C1 is regarded as an output voltage with respect to the reference potential (output GND), and the load circuit 105 is driven by potential difference therebetween.

Further, a connection point of the source of the switch S1 and the drain of the switch S2 is taken as an U point (first connection point), and a connection point of the anode of the diode D1 and the cathode of the diode D2 is taken as a V point (second connection point).

The alternating voltage power supply Vac and an inductor L1 are connected in series between the U point and the V point. These sequences of the connection are not specifically limited and can be varied.

An alternating voltage detection section 100 is connected with a position where a voltage of the alternating voltage power supply Vac can be detected, and a detection signal thereof is taken as Vs3.

A first current detection section 101 is connected with a position where a current of the diode D1 can be detected by taking the potential of the V point as a reference potential, and a detection signal thereof is taken as Is1. A second current detection section 102 is connected with a position where a current of the diode D2 can be detected by taking the potential of the potential of the V point as the reference potential, and a detection signal thereof is taken as Is2.

A first boosted DC output voltage detection section 103 is connected with a diode D3 in series from a positive terminal of the capacitor C1 towards the V point, and a detection signal thereof is taken as Vs1. A second boosting detection section 104 is connected with diode D4 in series from the V point towards a negative terminal of the capacitor C1, and a detection signal thereof is taken as Vs2.

The foregoing Vs1, Vs2, Vs3, Is1, Is2 and the potential of the V point are input to the control section 106. The potential of the V point is used as GND potential for control of control section 106. Thus, the control section 106 operates through the potential difference from the output GND supplied to the load circuit 105.

The load circuit 105 may be a resistance load such as a heater or other power conversion devices that take a DC voltage as the input. If specifically exemplified, the load circuit 105 may be an inverter circuit, a converter circuit, a motor drive circuit, a constant current supply circuit and the like.

The control section 106 generates a drive pulse P1 of the switch S1 and a drive pulse P2 of the switch S2 on the basis of the above-mentioned detection signals.

At this time, by properly controlling pulse widths of the pulses P1 and P2, an input current can be controlled and a plurality of above-mentioned control signals is used as the control condition. The details are described when the undermentioned control section 106 is described.

Figure 2:
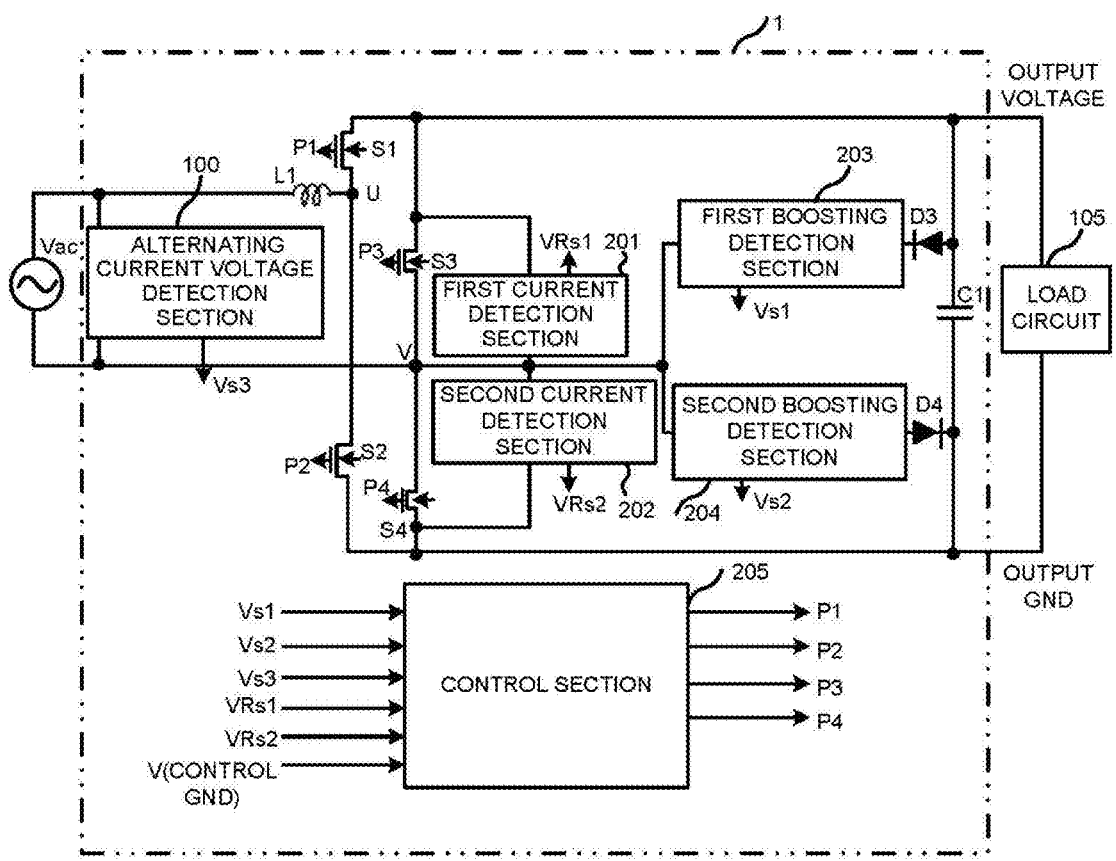
FIG. 2 is a circuit structure diagram of a power conversion apparatus according to a second embodiment.

FIG. 2 is a diagram illustrating a power conversion apparatus according to a second embodiment with a structure different from the power conversion apparatus 1. The majority of a power conversion apparatus 2 shown in FIG. 2 is identical to the power conversion apparatus 1 shown in FIG. 1, and only the different points are described.

In the power conversion apparatus 2, the semiconductor switches S1, S2, S3 and S4 constitute a bridge. The power conversion apparatus 2 differs from the power conversion apparatus 1 in that the power conversion apparatus 2 uses the semiconductor switches S3 and S4 instead of the diodes D1 and D2 serving as passive elements. However, the semiconductor switches S3 and S4 are not used as switches but instead used for the purpose of synchronous rectification.

Herein, the synchronous rectification is described. As the semiconductor switches S3 and S4 contain body diodes, a current flows from the source to the drain even if the semiconductor switches S3 and S4 are not operated. In other words, the state is a diode operation identical to the power conversion apparatus 1 of the first embodiment. At this time, a forward voltage of the diode is assumed as 2V.

Next, during a period when the current flows to the body diodes of the semiconductor switches S3 and S4, the gate becomes ON. If ON resistance of the semiconductor switch is very small, potential difference occurring at both ends thereof is also small. For example, it is assumed that the average current of 2 A flows, and if the ON resistance is $0.1\Omega$, a voltage generated due to the ON resistance is as follows: V=I*R=2*0.1=0.2V. As the voltage value is smaller than 2V of the above-mentioned forward voltage, the current functions in such a way as to flow through a path of the resistance component but not a path of the body diode. As a result, loss W in the case of the diode is as follows: W=I*V=2*2=4 W, and thus loss via the ON resistance reduces sharply as follows: W=$I^2$*R=2*2*0.1=0.4 W.

In this way, using FET instead of the diode is referred to as "synchronous rectification", which has the same function as the diode.

In the power conversion apparatus 1, the current detection section is arranged in the path of the diode. On the other hand, in the power conversion apparatus 2, a signal identical to that of current detection is obtained by detecting the voltage generated through the ON resistance of the semiconductor switches S3 and S4. This is because that I and V meets a proportional relation according to the formula "I=V/R", and if the ON resistance R is constant, while V is measured, I is measured equivalently.

In this way, it is unnecessary to insert resistance for current detection to the paths of the semiconductor switches S3 and S4, and power loss generated due to the detection can be advantageously reduced.

Further, it is applicable for the power conversion apparatus 2 to adopt a method of the current detection used by the power conversion apparatus 1 without prohibiting the current detection.

The power conversion apparatus 2 includes a first voltage detection section 201 for detecting a voltage caused by the ON resistance of the switch S3, and a detection signal thereof is assumed as VRs1. Further, the power conversion apparatus 2 includes a second voltage detection section 202 for detecting a voltage caused by the ON resistance of the switch S4, and a detection signal is assumed as VRs2.

A control section 205 of the power conversion apparatus 2 inputs the Vs1, the Vs2, the Vs3, the VRs1, the VRs2 and the potential of the V point serving as the foregoing detection signals. The potential of the V point is regarded as the control GND (voltage reference point).

The above is difference between the power conversion apparatus 1 of the first embodiment and the power conversion apparatus 2 of the second embodiment. As the power conversion apparatus 1 and the power conversion apparatus 2 are common in an operation principle, hereinafter, the power conversion apparatus 1 is mainly used to simultaneously describe the common operation principle of the power conversion apparatus 1 and the power conversion apparatus 2. Further, a control block is described separately due to the different embodiments.

Figure 3:
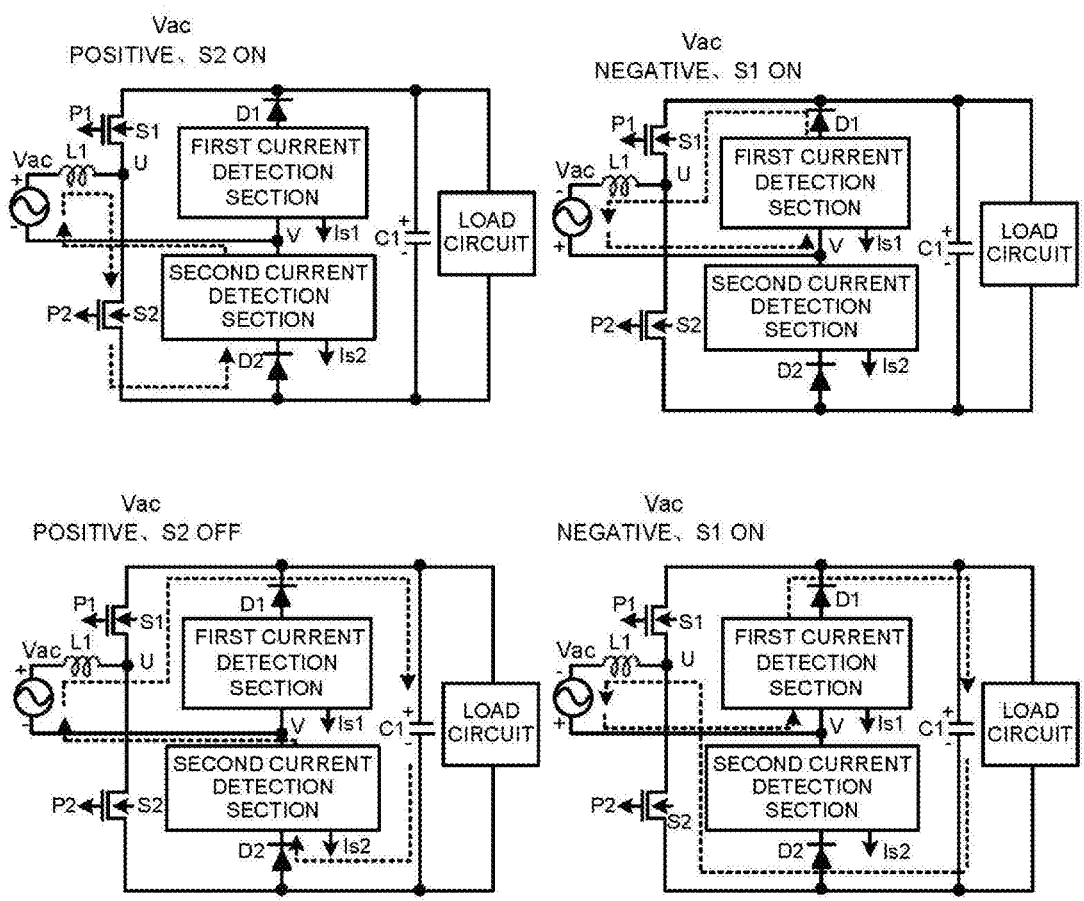
FIG. 3 is a diagram illustrating an operating current path according to the embodiment.

The common operation principle is described in FIG. 3. In FIG. 3, dotted line arrows constitute a route through which current flows.

The left side of FIG. 3 indicates a case in which the alternating current power supply Vac is positive, the circuit current is controlled by opening and closing the switch S2 in the positive polarity. The upper-left figure indicates a case in which the switch S2 is in an ON state. In the case of the upper-left subfigure, a closed loop is formed in the order of the Vac, the L1, the S2, the D2 (S4 in the case of the power conversion apparatus 2) and the Vac through a positive voltage generated in the alternating current power supply Vac, and the current flows thereto according to a voltage applied by the Vac.

Next, if the switch S2 is in an OFF state as shown in the lower-left subfigure, through energy of a reactor stored in the inductor L1, the inductor L1 continuously plays a role of trying to make the current flow in the same direction. Thus, a closed loop is formed in the order of the Vac, the L1, the S1, the C1, the D2 (S4 in the case of the power conversion apparatus 2) and the Vac. The loop has a function of charging an electric charge to the capacitor C1.

The subfigures at the right side of FIG. 3 indicate operations in a case in which the alternating current power supply Vac is negative. The upper-right subfigure is a case in which the switch S1 is in the ON state, and a closed loop is formed in the order of the Vac, the D1 (S3 in the case of the power conversion apparatus 2), the S1, the L1 and the Vac. The current flows to the path according to the voltage applied by the Vac.

In the lower-left subfigure, the switch S1 is in the OFF state, and a closed loop is formed in the order of the Vac, the D1 (S3 in the case of the power conversion apparatus 2), the C1, the S2, the L1 and the Vac. The loop has a function of charging an electric charge to the capacitor C1.

In the foregoing operations, regardless of the positive polarity and the negative polarity of the alternating current power supply Vac, if the circuit current detection is carried out with the method, it is possible to detect the signal of the V point, that is, the signal at a position nearest to the control GND. In this way, frequency at which the noise is mixed to the detection signal is advantageously decreased, and the occurrence of the malfunction can be suppressed.

Figure 4:
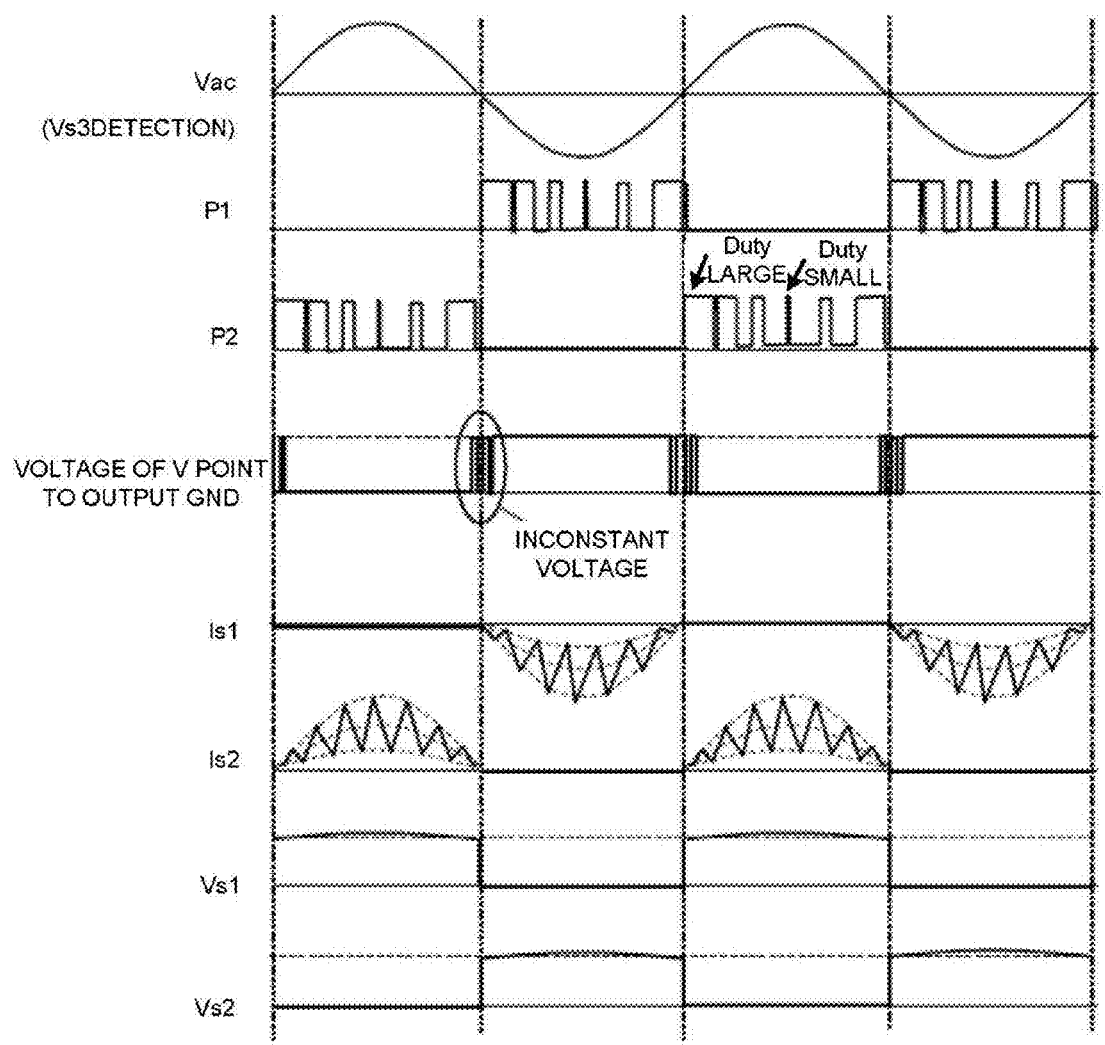
FIG. 4 is a diagram illustrating an operating waveform according to the first embodiment.

Next, an operating waveform in the power conversion apparatus 1 is described with the use of FIG. 4. The waveforms respectively represent the alternating current power supply Vac (equivalent to the detection signal Vs3), a driving signal P1 of the switch S1, a driving signal P2 of the switch S2, the voltage of the V point, the detection signal Is1 of the first current detection section 101, the detection signal Is2 of the second current detection section 102, the voltage detection signal Vs1 of the positive electrode of the capacitor C1 when the V point is set as the reference, and the voltage detection signal Vs2 of the negative electrode of the capacitor C1 in the order from top to bottom.

The alternating current power supply Vac is, for example, a commercial power supply 100V of 50 Hz, and applies a positive sine wave voltage and a negative sine wave voltage alternately.

In the embodiment, under the control of the control section 106, the driving signal P2 of the switch S2 operates when the Vac is positive, and the driving signal P1 of the switch S1 operates when the Vac is negative. Further, in the embodiment, it is possible that a ratio of the ON time of the driving signals P1 and P2 is changeable, and the control section 106 performs a control in such a manner that the ratio of the ON time becomes large when the Vac voltage is low and that of the ON time becomes small when the Vac voltage is high, which is described later. As a result of the control, a current waveform similar to the waveform of the Vac can be generated (function of PFC).

The potential of the V point becomes zero volt with respect to the output GND in a state in which the open and close of the switch S2 is repeated when the Vac is positive. This is because the diode D2 is in a power-on state and the potential of the V point becomes identical to that of the output GND.

The potential of the V point becomes the voltage of the C1 with respect to the output GND in a state in which the open and close of the switch S1 is repeated when the Vac is negative. This is because the diode D1 is in a conduction state and the potential of the V point becomes equal to that of the positive electrode of the C1.

However, at the time of the voltage of the Vac is around zero volt, the potential of the V point becomes uncertain as the circuit current hardly flows.

The detection signal Is1 of the current is an output signal from the first current detection section 101 in a case in which the potential of the V point is taken as the reference potential. As the current flows in a direction towards the D1, the first current detection section 101 detects a negative value from the V point. The circuit current becomes a sine wave of 50 Hz in phase with the alternating current power supply Vac (indicated by dotted lines in FIG. 4) on the whole, and the 50 kHz component of the switching (indicated by solid line waveforms in FIG. 4) is also contained. The detection signal Is1 detects the sine wave of 50 Hz and the 50 kHz component of the switching correctly. Further, in FIG. 4, though it is not correctly indicated that the pulse of the P1 and the waveform of the Is1 are synchronized, actually, the pulse of the P1 and the waveform of the Is1 are indeed synchronized.

The current detection signal Is2 is a signal of the second current detection section 102 in a case in which the potential of the V point is the reference potential. As the current flows in a direction towards the D2, the second current detection section 102 detects a positive value from the V point. Similarly, the pulse of the P2 and the waveform of the Is2 are synchronized as well. In other words, when the P2 is ON, the slope of the Is2 is positive, and when the P2 is OFF, the slope of the Is2 is negative. Duty of the Is2 also changes similarly to the P2.

Figure 5:
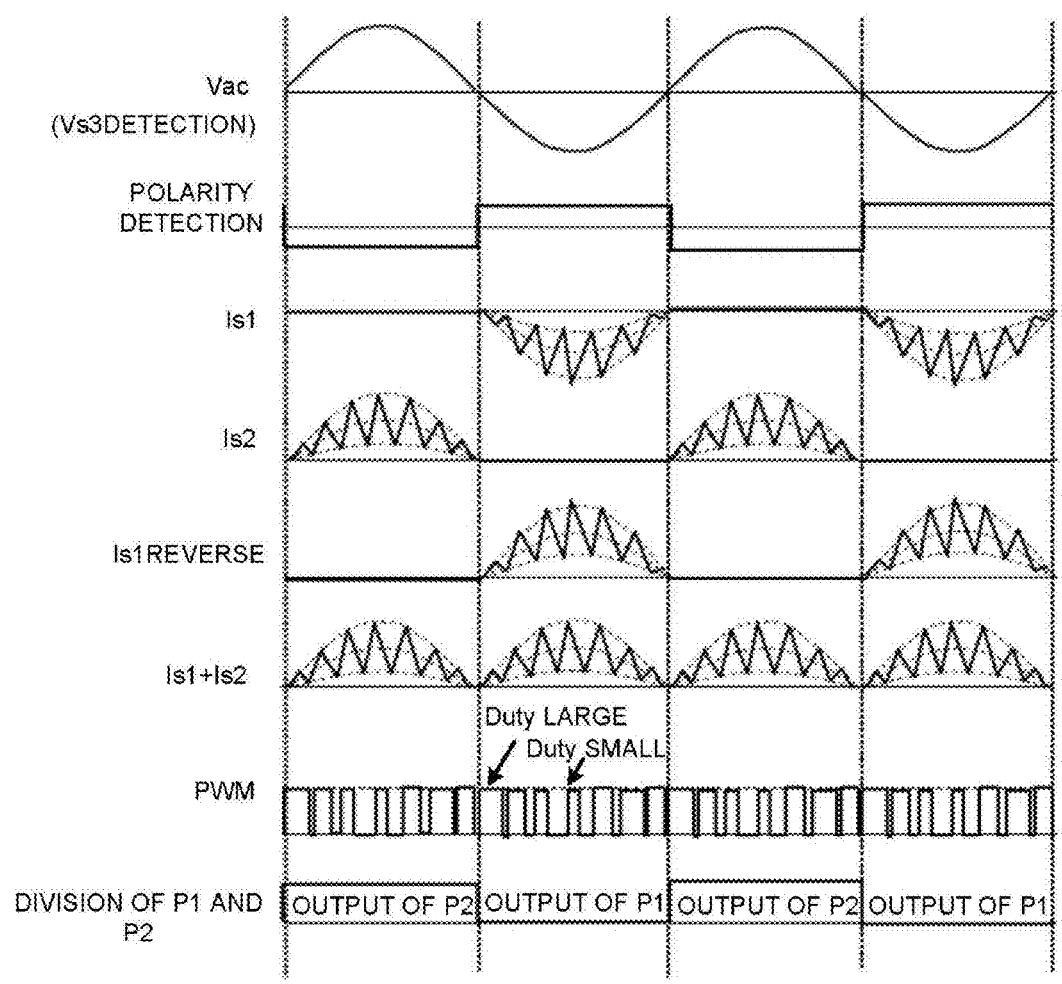
FIG. 5 is a diagram illustrating an operating waveform according to the first embodiment.

When the control section 106 processes these signals, the current detection signal of which the polarity is reversed is difficult to be processed as it is. Thus, in the present embodiment, as the same control processing can be carried out whether the voltage polarity of the Vac is positive or negative, the Is1 signal is reversed and is wholly united to the positive value as shown in FIG. 5. Then, the embodiment synthesizes the Is1 reversion signal and the Is2 signal into one signal. The control function of the PFC operates on the basis of the signal (Is1 reversion signal+Is2 signal). A drive pulse of an operated switch is a PWM (Pulse Width Modulation) waveform, and this method is a control of enabling the pulse width to be modulated (in other words, controls a time ratio).

However, if the Is1 reversion signal and the Is2 are synthesized, information indicating which one of the switches S1 and S2 is supposed to be driven is erased. Thus, the control section 106 has a function of detecting the polarity of the Vac to determine that the signal is divided to which one of the switches S1 and S2. The control section 106 determines the division of the signal through the detection signal Vs3 of the alternating current voltage detection section 100. Specifically, the control section 106 performs a control to determine that the signal is divided to the S2 (output of the P2) when the Vs3 signal is positive and that the signal is divided to the S1 (output of the P1) when the Vs3 signal is negative.

Figure 6:
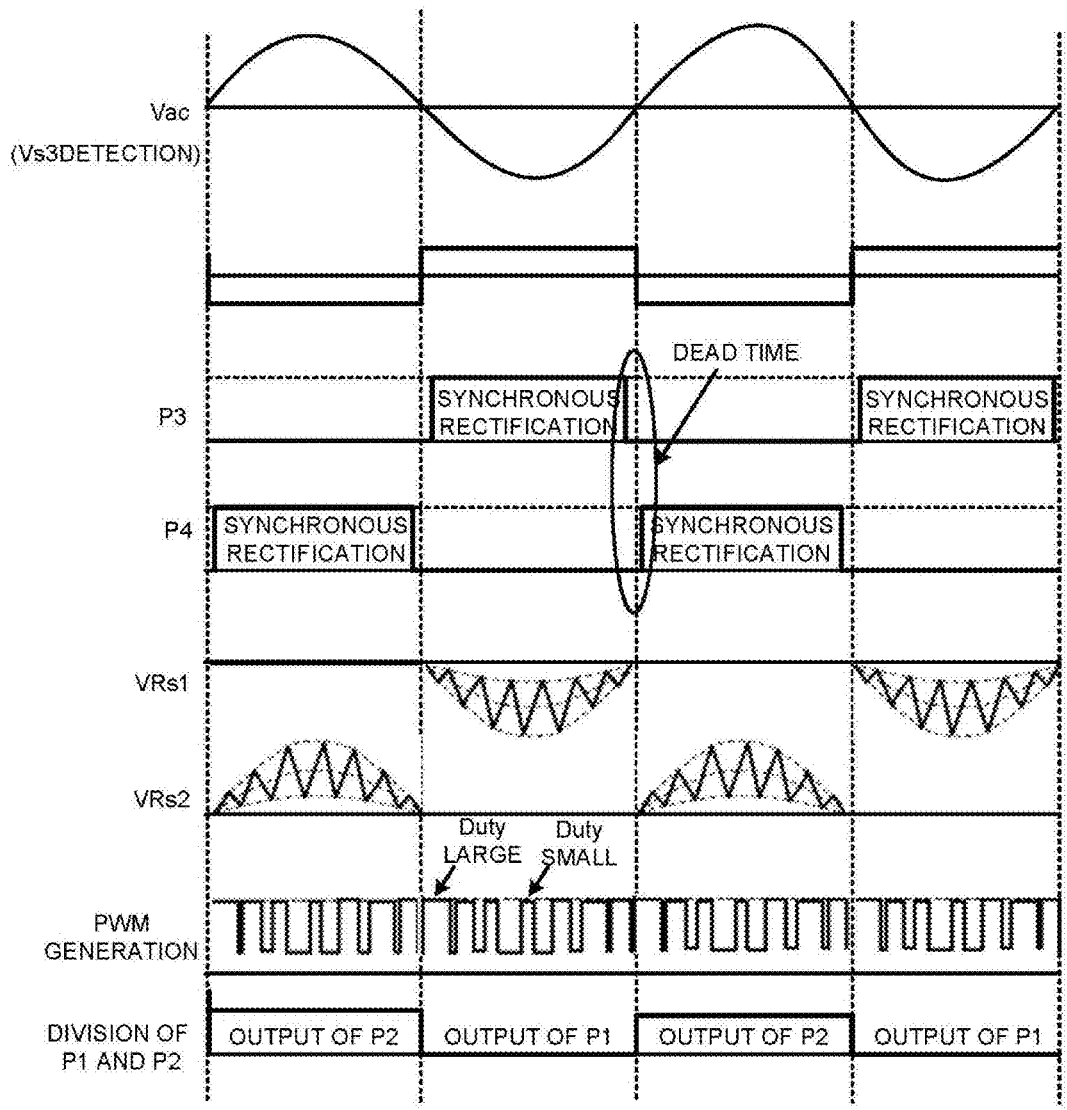
FIG. 6 is a diagram illustrating an operating waveform according to the second embodiment.

Next, an operating waveform in the power conversion apparatus 2 of the second embodiment is described with the use of FIG. 6. Further, the description of the operating waveforms in the power conversion apparatus 2 common to that in the power conversion apparatus 1 shown in FIG. 4 and FIG. 5 is omitted. The waveforms respectively represent the detection signal Vs3 of the alternating current power supply Vac, a polarity detection waveform for determining the polarity of the alternating current power supply on the basis of the Vs3, a driving signal P3 of the switch S3, a driving signal P4 of the switch S4, VRs1 for detecting a fine voltage generated through the ON resistance at the time of the synchronous rectification of the switch S3, VRs2 for detecting a fine voltage generated through the ON resistance at the time of the synchronous rectification of the switch S4, a driving signal PWM of the P1 and P2 generated based on these current detection results (PWM generation), and a signal for dividing the PWM to which one of the P1 and P2 in the order from top to bottom.

In FIG. 6, a point of distinction from the power conversion apparatus 1 is that it is necessary to generate driving signals of the switches S3 and S4. The power conversion apparatus 2 takes a slight bias voltage as a threshold value to determine the polarity on the basis of the signal of the Vs3. The power conversion apparatus 2 sets both the P3 and the P4 to zero at the time the voltage of the Vac is around zero to generate time when both of the P3 and the P4 do not operate. The time is called dead time. As the circuit is shorted and damaged if the P3 and the P4 are in the ON state at the same time by some chance, the purpose of arranging the dead time is to prevent the short circuit and the damage. Further, as the potential of the V point is inconstant at the time the voltage of the Vac is around zero, another purpose of arranging the dead time is to enable the switches S3 and S4 to operate through the body diode of the FET without the synchronous rectification.

As a result, the current flows to the S3 and the S4 alternately and synchronously at 50 Hz, the waveforms appear as the detection values VRs1 and VRs2. The waveforms are equal to the current flowing to the S1 and S2 and contain both the 50 Hz component of the alternating current power supply and the 50 kHz component of the switching. The components of the alternating current power supply and the switching in the VRs1 and the VRs2 can be detected by taking the potential of the V point as the reference potential.

Hereinafter, the PWM waveform and the division of the P1 and the P2 are identical to these in the power conversion apparatus 1, and thus the description thereof is omitted.

Figure 7:
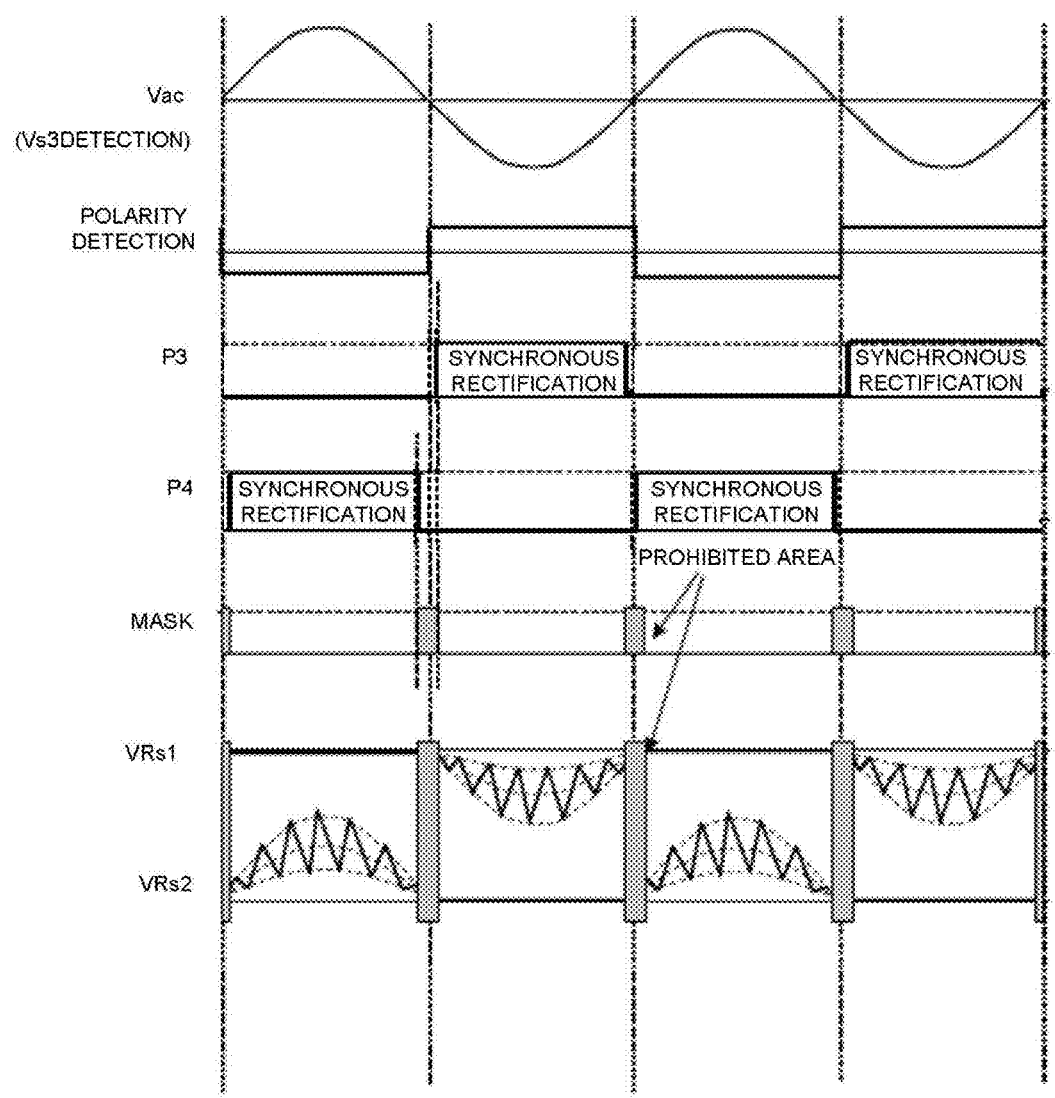
FIG. 7 is a diagram illustrating a current detection prohibited area (prohibited range) according to the second embodiment.

Next, it is aware that the potential of the V point is inconstant at the time the voltage of the Vac is around zero, and at this time, a method of applying a mask to a current detection value is described with the use of FIG. 7.

The waveforms in FIG. 7 respectively represent the Vac detection signal Vs3, polarity detection, the P3, the P4, a mask signal, the VRs1 signal and the VRs2 signal in the order from top to bottom. Only the part different from the foregoing waveforms is described.

The power conversion apparatus 2, on the basis of pulse signals of the synchronous rectification the P3 and the P4, deduces the parts where the P3 and the P4 are both in the OFF state (parts where the synchronous rectification is not carried out). The power conversion apparatus 2 outputs the mask signal to the sections (sections indicated by forbidden areas in FIG. 7).

The time when the synchronous rectification is not carried out refers to a section where the rectification is carried out by the body diode of the FET. As the potential of the V point is unstable in the section, in this case, even at the timing of the conduction, there is a possibility that a high voltage in the state of diode cutoff is applied.

For example, if the boosting of the C1 is 400V, the average circuit current is 2 A and the ON resistance is 0.1Ω, at the time of the synchronous rectification, an extremely fine voltage is detected as follows: V=I*R=2*0.1=0.2V. However, if the cutoff of the diode occurs, the detected voltage rises to 400V at once. The 400V is a value far apart the 0.2V, and thus there is a problem in the control.

Thus, in the second embodiment, in the mode in which the cutoff of the diode can occur, that is, at the part of the mask signal, the VRs1 and VRs2 signals are not considered. In this way, it is possible to prevent the input of a value far apart from the original signal value, which promotes the prevention of the malfunction.

Figure 8:
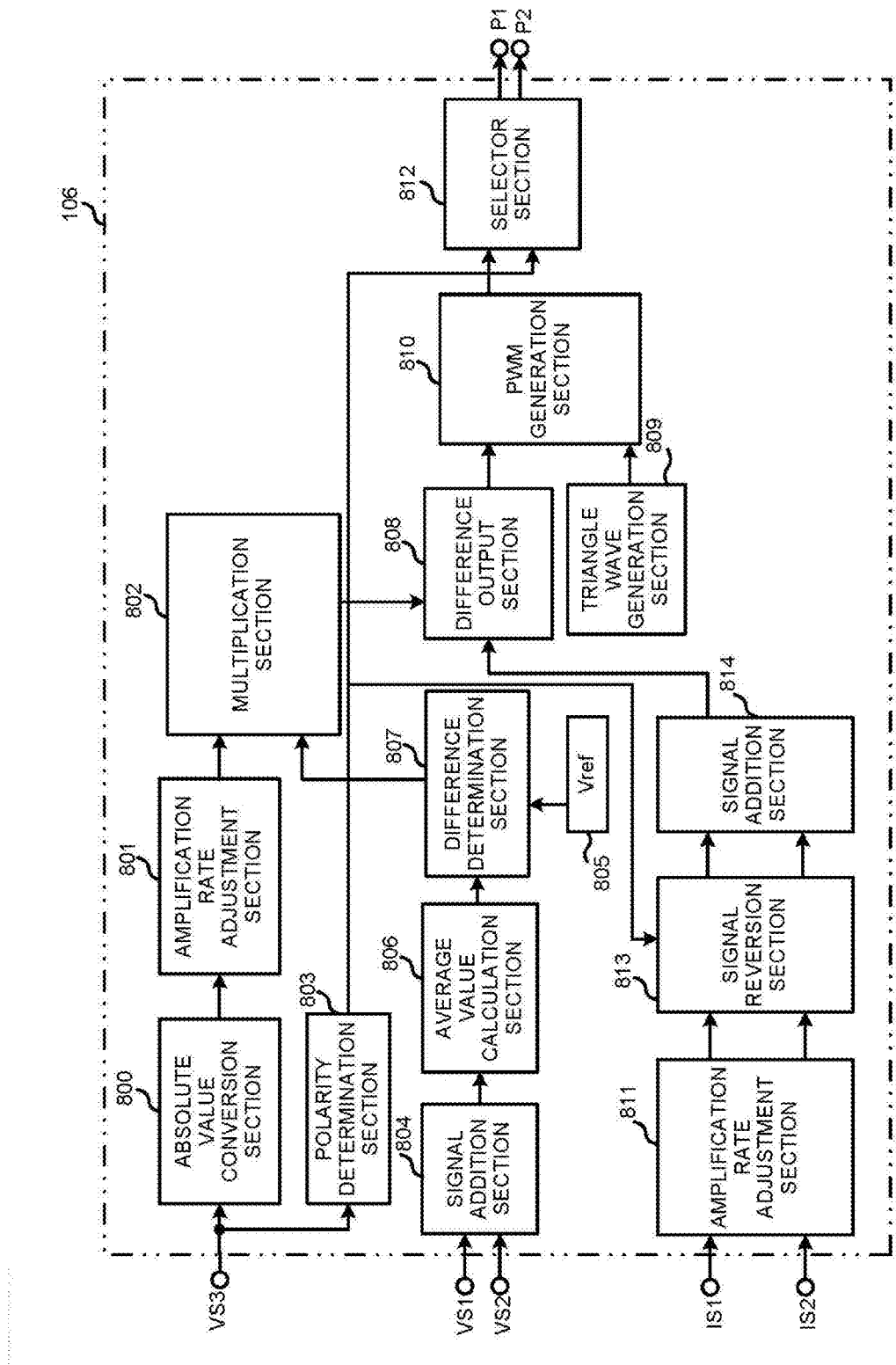
FIG. 8 is a diagram illustrating the internal structure of a control section according to the first embodiment.

Next, a structure example of the control section 106 of the power conversion apparatus 1 is indicated in FIG. 8. In FIG. 8, the input includes the Vs1, the Vs2, the Vs3, the Is1, the Is2 and the potential of the V point (not shown in FIG. 8), and the output includes the P1 and the P2. As the Is1, the Is2, the Vs1 and Vs2 are values obtained by taking the potential of the V point as the reference potential, the potential of the V point is summarized in the signals of the Is1, the Is2, the Vs1 and the Vs and can be considered to be input indirectly.

The voltage of the alternating current power supply Vac is input through the detection signal Vs3 and converted to a positive value through an absolute value conversion section 800. For example, if the value of the Vac is 100V, the positive peak voltage is 141V and the negative peak voltage is −141V; however, the absolute value conversion section 800 converts the positive voltage and the negative voltage to an absolute value to set the voltage to a voltage from 0 to 141V.

The signal from the absolute value conversion section 800 is input to a multiplication section 802 after an amplification rate adjustment section 801 adjusts an amplification rate. The multiplication section 802 inputs difference between a boosting voltage of the C1 and a predetermined voltage (Vref 805) described later to carry out multiplication with the foregoing absolute value signal of the AC voltage (after the adjustment of the amplification rate) at real time.

The AC voltage detection value Vs3 is also input to a polarity determination section 803. The polarity determination section 803 determines whether the AC voltage is positive or negative. For example, the polarity determination section 803 outputs 1 if the AC voltage is positive and outputs −1 if the AC voltage is negative.

A multiplication result by the multiplication section 802 is input to a difference output section 808 which compares the multiplication result with a circuit current signal described later. The multiplication result by the multiplication section 802 is treated as a target value of the current absolutely but not the voltage value. In other words, the difference output section 808 determines how much the difference between the actually measured current detection value and the target value is. Then, the difference output section 808 outputs the difference.

A PWM generation section 810 determines a magnitude relation between the result of the difference of the difference output section 808 and a triangle wave output by a triangle wave generation section 809. For example, the PWM generation section 810 outputs 1 if the triangle wave is larger than the result of the difference and outputs 0 if the triangle wave is smaller than the result of the difference. Thus, if the result of the difference is smaller than the triangle wave, the sections of 1 become more. In other words, the time ratio is adjusted.

A selector section 812 inputs a PWM signal generated by the PWM generation section 810. Furthermore, the selector section 812 also inputs the signal of the polarity determination section 803 to assign the PWM signal to either of the drive pulses P1 and P2 on the basis of the determination result of the polarity. The drive pulse to which the PWM signal is not assigned is zero (stopped).

Next, the treatment of the boosting detection signals Vs1 and Vs2 is described. The two boosting detection signals Vs1 and Vs2 alternately output the boosting voltage in response to the AC polarity. When there is no boosting detection signal, the value of the boosting voltage is zero. A signal addition section 804 adds the Vs1 and the Vs2 as one boosting signal.

An average value calculation section 806 inputs the signal from the signal addition section 804 to calculate an average value of the boosting voltages. Herein, it is assumed that the averaging of about several cycles to dozens of cycles of 50 Hz is carried out. In a case in which the cycle time is shorter than the range, the operation of the PFC becomes unsteady, and the current becomes a bent waveform but not a sine wave. Further, in a case in which the cycle time is larger than the range, time is spent on a feedback control, and overshoot or undershoot of the boosting occurs.

A difference determination section 807 carries out a difference comparison between the averaged boosting voltage and the boosting voltage value Vref (805) set as a target value. For example, when the detected boosting voltage is lower than the target value, the result of the difference by the difference determination section 807 becomes a large value. Thus, the result is transferred to the foregoing multiplication section 802, and plays a role of increasing the amplification rate to the absolute value waveform of the Vac. In other words, the result plays a role of increasing the circuit current. As a result, the input current is increased if the boosting voltage is low, and the feedback is applied to enable the boosting voltage of the capacitor C1 to recover.

Next, the treatment of two current detection signals Is1 and Is2 is described. An amplification rate adjustment section 811 inputs the Is1 and the Is2 and adjusts them to proper amplification, and outputs the proper amplification to a signal reversion section 813. The signal reversion section 813 also inputs the signal of the polarity determination section 803 at the same time. For example, when the AC polarity is negative, the S1 operates, the current is detected through the Is1 and the detection value is negative. At this time, as the value of the polarity determination section 803 is −1, the negative detection value becomes a positive value if multiplication is performed. In this way, either of the Is1 and the Is2 is converted the positive value. The multiplication may be performed by a digital signal processing using a DSP or an analog signal processing using an analog multiplier.

The two signals converted to the positive signals are input to a signal addition section 814. The signal addition section 814 aggregates the two signals to one signal. The signal addition section 814 outputs the aggregated signal to the difference output section 808. For example, if the actual current value is smaller than the target value of the current generated through the multiplication section 802, the output by the difference output section 808 becomes small. Thus, an ON time ratio of the pulses generated by the PWM generation section 810 becomes large. In this way, conduction time of the switch becomes long and the input current is increased. In other words, if the value of the input current is smaller than the target value, the feedback is applied to increase the input current. On the contrary, if the actual current value is greater than the target value of the current generated by the multiplication section 802, the output by the difference output section 808 becomes large. Then, the ON time ratio of the pulses generated by the PWM generation section 810 becomes small. In this way, the conduction time of the switch becomes short and the input current is decreased.

The foregoing functions can also be realized through any one of software, firmware, middleware, digital hardware and analog hardware or a mixed unit. As a result, the input current becomes the sine wave equal to the input voltage and in phase therewith. In this way, the power conversion apparatus with extremely low input current high-frequency component can be provided.

Further, as the feedback is applied to make the boosting voltage constant, a stable direct current voltage can be provided to the load.

After the foregoing basic functions of the PFC are completely satisfied, as the first and second current detection sections (101 and 102) for detecting the circuit current can be a resistance element (for example, 0.1Ω), the cost thereof is extremely cheap and moreover the occupied area is small. Further, as the current detection is possible at a position nearest to the control GND, there are also advantages that the noise mixing is less and the operation is stable.

According to the above, a disadvantage of the detection method using insulated current transformer of the conventional technology can be improved drastically.

Next, an internal structure example of the control section 205 of the power conversion apparatus 2 is described with reference to FIG. 9. The portion overlapping with the description of FIG. 8 is omitted and only the different parts are described.

Figure 9:
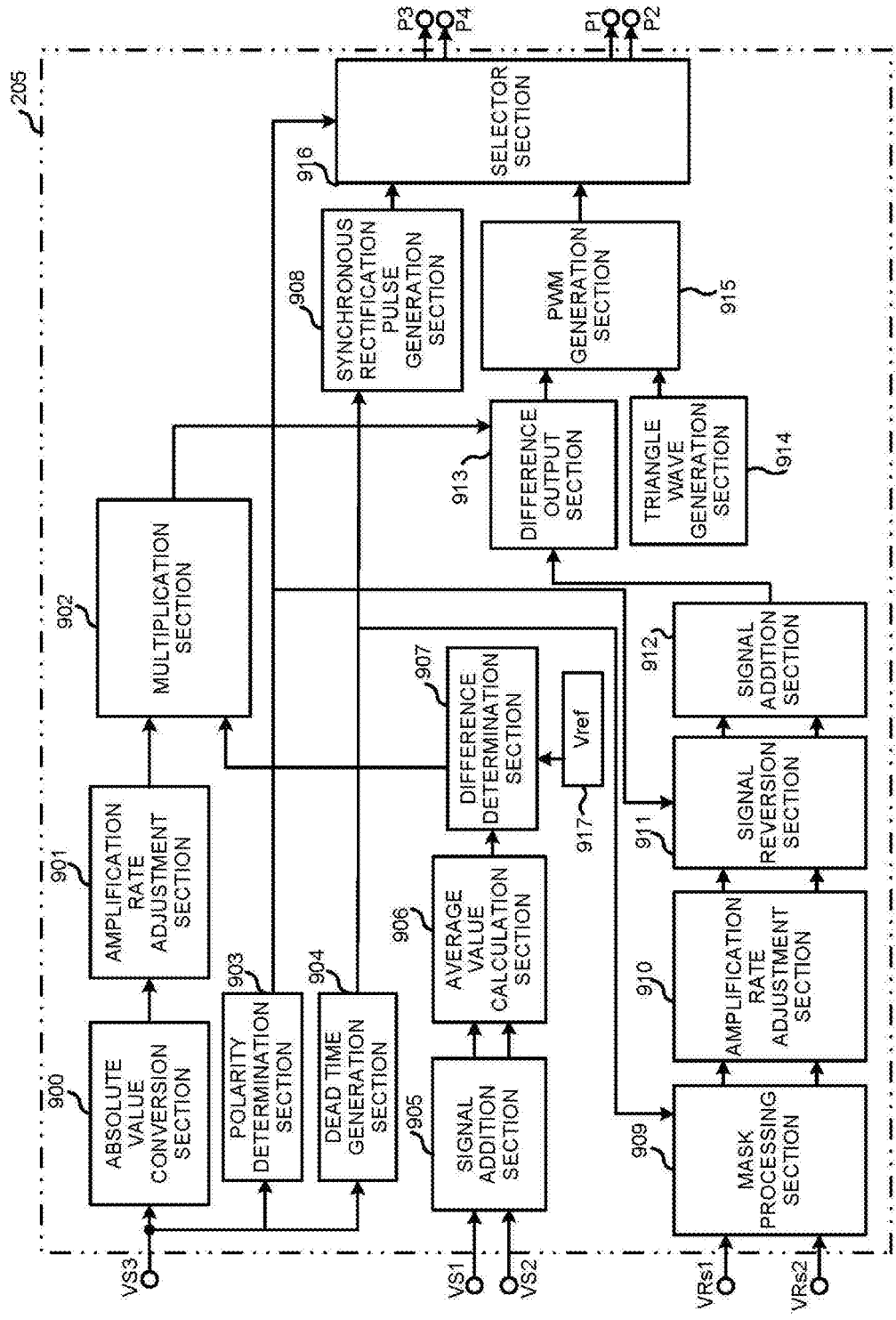
FIG. 9 is a diagram illustrating the internal structure of a control section according to the second embodiment.

FIG. 9 illustrates an internal block of the control section 205. The input includes the Vs1, the Vs2, the Vs3, the VRs1, the VRs2 and the voltage of the V point as the control GND (not shown in FIG. 9). The output includes the P1, the P2, the P3 and the P4.

On the basis of the signal Vs3 for detecting the AC voltage, a dead time generation section 904 sets a condition of the dead time. The dead time generation section 904 sets, for example, a range from −5V to +5V as the dead time.

On the basis of the signal, a synchronous rectification pulse generation section 908 generates a pulse signal excluding the dead time. For example, the synchronous rectification pulse generation section 908 assumes the range from −5V to +5V as 0 and other ranges as 1.

The signal is input to a selector section 916 and assigned to the P3 or the P4 in response to the result of a polarity determination section 903. One side to which no signal is assigned becomes zero, and the S3 or the S4 in this case is in the OFF state. For example, if the AC voltage is positive, the selector section 916 outputs a synchronous rectification pulse to the P4 side. At this time, the P3 side becomes zero output. If the AC voltage is negative, the selector section 916 outputs the synchronous rectification pulse to the P3 side and the P4 side becomes zero output.

The VRs1 and the VRs2 serving as signals for detecting the both-end voltages of the switches S3 and S4 at the time of the synchronous rectification are input to a mask processing section 909. The mask processing section 909 also inputs the signal of the dead time generation section 904 at the same time. Then, the mask processing section 909 carries out a processing of disabling the signal of either of the VRs1 and the VRs2, for example, at the dead time when the AC voltage is in the range from −5 to +5V. The mask processing section 909 sets zero or a predetermined small value instead.

An amplification rate adjustment section 910 adjusts amplification rates of two signals. The two adjusted signals are input to a signal reversion section 911. The signal reversion section 911 multiplies −1 by the negative signal to convert the negative value to the positive value.

A signal addition section 912 inputs the result and aggregates the two signals into one signal, and a difference output section 913 inputs the aggregated signal. The following operations are identical to these in FIG. 8, and thus the description thereof is omitted.

The selector section 916 carries out an output control such that the switch S4 keeps a conduction state at a low-frequency pulse during a period when the switch S1 carries out an oscillation operation at a high-frequency pulse. Further, the selector section 916 carries out an output control in such a manner that the switch S3 keeps the conduction state at the low-frequency pulse during a period when the switch S2 carries out the oscillation operation at the high-frequency pulse. As a pair of operations, the S1 and the S4 are divided into one group and the S2 and the S3 are divided into another group.

According to the above, through applying the second embodiment, in addition to achievement of the same effect as the first embodiment, the following new advantages are added.

First, as the resistance element for detection is unnecessary for the current detection section, the power loss caused by the resistance element can be eliminated.

Next, by carrying out the synchronous rectification, the conduction loss can be reduced in the case of the first embodiment using the diode.

Thus, after satisfying the basic functions as the PFC, a current detection method which is cheap in cost and small in the occupied area can be provided, and the power conversion efficiency can be further improved.

The description in the embodiment only indicates one example and is not limited to the specific structure shown.

A case using the triangle wave in the present embodiment is described as a method of the PWM generation; however, the present invention is not limited to the method, for example, a sawtooth wave can be used to generate the PWM.

Further, it is described that the alternating current power supply voltage is regarded as the sine wave as the target value of the current and becomes a current having the similar shape to the sine wave; however, the present invention is not limited to this, for example, a reference sine wave independent in the inside of the control block may be generated.

As stated above, according to the technology described in the specification, a technology is provided in which the compact size of the apparatus can be realized, the noise mixing is less, and the operation is steady.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A power conversion apparatus, comprising:
a power conversion circuit configured to include a first switch, a second switch connecting with the first switch in series, a first diode, a second diode connecting with the first diode in series, a closed circuit that respectively connects the first switch and the first diode with the second switch and the second diode, a first inductor connecting with alternating voltage power supply in series, a first connection point, positioned between the first switch and the second switch, which connects with one end of the series connection of the alternating current power supply and the first inductor, a second connection point, positioned between the first diode and the second diode, which connects with the other end of the series connection of the alternating current power supply and the first inductor and a capacitor connected with both ends of the series connection of the first diode and the second diode, and to take potential difference of both ends of the capacitor as an output voltage;

an alternating voltage detection section configured to detect a power supply voltage of the alternating voltage power supply;

a boosted DC output voltage detection section configured to detect a both-end voltage of the capacitor;

a current detection section configured to detect a current flowing to the first and second diodes; and a control section configured to, on the basis of a power supply voltage obtained from the alternating voltage detection section, a boosted DC output voltage obtained from the boosted DC output voltage detection section and a circuit current obtained from the current detection section, supply a pulse signal for enabling the first switch and the second switch to be opened and closed alternately in response to a polarity of the alternating voltage power supply so that a sine wave current synchronized with a voltage phase of the alternating voltage power supply flows to the alternating voltage power supply.

2. The power conversion apparatus according to claim 1, wherein the current detection section comprises a first current detection section arranged between the second connection point and anode of the first diode and a second current detection section arranged between cathode of the second diode and the second connection point, and detects a current flowing to the first diode and the second diode by taking the second connection point as reference potential of control.

3. The power conversion apparatus according to claim 1, wherein the boosted DC output voltage detection section comprises a third diode of which one end is connected with positive electrode of the capacitor, a first boosting detection section of which one end is connected with the other end of the third diode in series and of which the other end is connected with the second connection point, a fourth diode of which one end is connected with negative electrode of the capacitor and a second boosting detection section of which one end is connected with the other end of the fourth diode and of which the other end is connected with the second connection point; and the control section carries out a feedback control to make the boosting voltage of the capacitor constant on the basis of a signal generated by adding a first boosting detection signal obtained from the first boosting detection section and a second boosting detection signal obtained from the second boosting detection section.

4. The power conversion apparatus according to claim 1, wherein the control section determines one input value of a multiplication section that outputs a multiplication output signal serving as a target value of the current on the basis of the power supply voltage obtained from the alternating current voltage detection section and determines the polarity of the power supply voltage; adds two signals as one signal on the basis of two boosting voltages obtained from the boosting detection section, calculates an average value of the added signals, calculates difference between the average value and a desired output voltage and assumes the result of the difference as another input value of the multiplication section; reverses one signal to match with the polarity of two signals on the basis of two circuit currents obtained from the current detection section and adds the reversed signal and the other signal as one current signal; carries out a difference comparison between a multiplication output signal of the multiplication section and the current signal after the addition, and generates a PWM signal obtained by extending a drive pulse width if the current signal is smaller than the multiplication output signal or narrowing the drive pulse width if the current signal is greater than the multiplication output signal; and outputs the PWM signal to either of the first switch and the second switch according to the polarity determination result of the alternating current power supply.

5. A power conversion apparatus, comprising:

a power conversion circuit configured to include a first switch, a second switch connecting with the first switch in series, a third switch, a fourth switch connecting with the third switch in series, a closed circuit that respectively connects the first switch and the third switch with the second switch and the fourth switch, a first inductor connecting with alternating voltage power supply in series, a first connection point, positioned between the first switch and the second switch, which connects with one end of the series connection of the alternating voltage power supply and the first inductor, a second connection point, positioned between the third switch and the fourth switch, which connects with the other end of the series connection of the alternating current power supply and the first inductor and a capacitor connected with both ends of the series connection of the third switch and the fourth switch, and to take potential difference of both ends of the capacitor as an output voltage;

an alternating voltage detection section configured to detect a power supply voltage of the alternating voltage power supply;

a boosted DC output voltage detection section configured to detect a both-end voltage of the capacitor;

a voltage detection section configured to detect both-end voltages of two switches generated at the time of a synchronous rectification operation of the third switch and the fourth switch; and a control section configured to supply a pulse signal for enabling the first switch and the second switch to be opened and closed alternately in response to a polarity of the alternating voltage power supply so that a sine wave current synchronized with a voltage phase of the alternating voltage power supply flows to the alternating current power supply and to supply a pulse signal for enabling the third switch and the fourth switch to alternately carry out synchronous rectification in response to a polarity of the alternating voltage power supply.

6. The power conversion apparatus according to claim 5, wherein the voltage detection section comprises a first voltage detection section for detecting a voltage generated through ON resistance of the third switch and a second voltage detection section for detecting a voltage generated through ON resistance of the fourth switch; and the control section inputs detection signals from the first voltage detection section and the second voltage detection section.

7. The power conversion apparatus according to claim 5, wherein the boosted DC output voltage detection section comprises a third diode of which one end is connected with positive electrode of the capacitor, a first boosted DC output voltage detection section of which one end is connected with the other end of the third diode and of which the other end is connected with the second connection point, a fourth diode of which one end is connected with negative electrode of the capacitor and a second boosting detection section of which one end is connected with another end of the fourth diode and of which the another end is connected with the second connection point; and the control section carries out a feedback control to make the boosting voltage of the capacitor constant on the basis of a signal generated by adding a first boosting detection signal obtained from the first boosted DC output voltage detection section and a second boosted DC output voltage detection signal obtained from the second boosting detection section.

8. The power conversion apparatus according to claim 5, wherein the control section outputs an operation prohibition signal if the voltage of the alternating voltage power supply is around zero and disables detection signals of the both-end voltages of the third switch and the fourth switch obtained from the voltage detection section while the operation prohibition signal is being output.

9. The power conversion apparatus according to claim 5, wherein the control section determines one input value of a multiplication section that outputs a multiplication output signal serving as a target value of the current on the basis of the power supply voltage obtained from the alternating voltage detection section, determines the polarity of the power supply voltage and carries out a dead time generation processing for setting a period so as to prevent output when the voltage of the alternating voltage power supply is around zero; adds two signals as one signal on the basis of two boosted DC output voltages obtained from the boosted DC output voltage detection section, calculates an average value of the added signals, calculates difference between the average value and a desired output boosted DC output voltage and assumes the result of the difference as another input value of the multiplication section; inputs two voltage signals obtained from the voltage detection section, carries out a mask processing of disabling either of the voltage signals during a period set by the dead time generation processing, reverses one signal if the signal is enabled and adds the reversed signal and the other signal as one current signal; carries out a difference comparison on a multiplication output signal of the multiplication section and the current signal after the addition, generates a PWM signal obtained by extending a drive pulse width if the current signal is smaller than the multiplication output signal or narrowing the drive pulse width if the current signal is greater than the multiplication output signal; and generates a synchronous rectification pulse according to the result of the dead time generation processing and outputs the synchronous rectification pulse signal to either of the third switch and the fourth switch while outputting the PWM signal to either of the first switch and the second switch according to the polarity determination result of the alternating current power supply.

10. The power conversion apparatus according to claim 9, wherein the control section carries out an output control in such a manner that the fourth switch is in a conduction state at a low-frequency pulse during a period when the first switch carries out an oscillation operation at a high-frequency pulse and carries out an output control such that the third switch is in the conduction state at the low-frequency pulse during a period when the second switch carries out the oscillation operation at the high-frequency pulse.

\* \* \* \* \*